US005083751A

United States Patent [19]

Chafin

[11] Patent Number: 5,083,751

[45] Date of Patent: Jan. 28, 1992

[54] CONTAINER FLOW CONTROL APPARATUS

[76] Inventor: Bob S. Chafin, Rt. 1, Box 225C, Lovelady, Tex. 75851

[21] Appl. No.: 619,390

[22] Filed: Nov. 29, 1990

[51] Int. Cl.[5] .................. F16K 31/00

[52] U.S. Cl. .................. 251/353; 251/354

[58] Field of Search .................. 251/353, 354; 137/312

[56] References Cited

U.S. PATENT DOCUMENTS 180,391 8/1876 Kraushar .................. 251/354

947,917 2/1910 Kollenberg .................. 251/353

956,562 5/1910 Beers et al. .................. 137/312

2,536,052 1/1951 Gohlke .................. 137/578

FOREIGN PATENT DOCUMENTS 1284001 1/1962 France .................. 251/354

*Primary Examiner*—A. Michael Chambers

*Attorney, Agent, or Firm*—Leon Gilden

[57] ABSTRACT

A pouring control device is provided mounted to a nozzle portion of a container, wherein the device includes a forwardly extending exit nozzle coaxially mounted to an upper housing that in turn is adapted to an associated container. The nozzle includes a coaxially arranged rod, with a conical truncated valve plug cooperative with a conical valve seat mounted within the upper housing, whereupon depressing the rod displaces the valve plug from the seat and directs fluid flow through the nozzle and a matrix of apertures provided within a floor of an associated slider tube mounted with the rod.

1 Claim, 4 Drawing Sheets

Fig 4
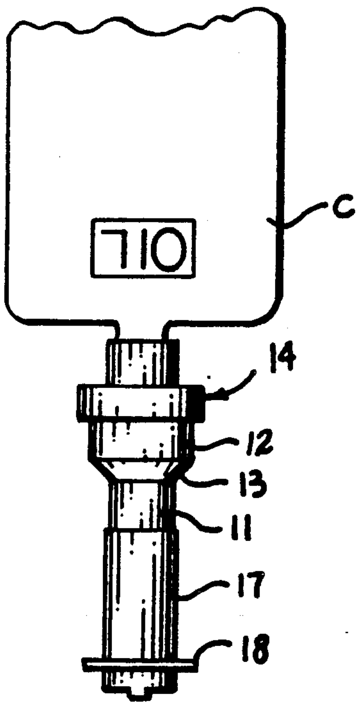
Fig 5
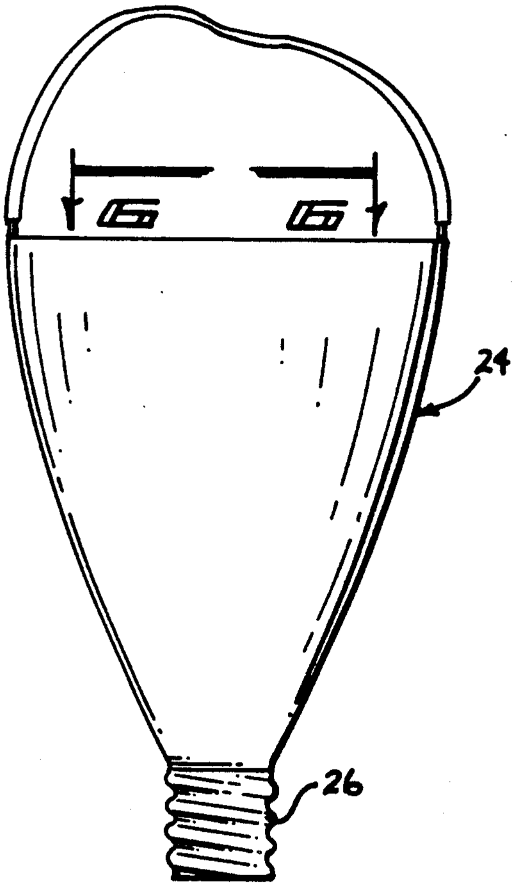
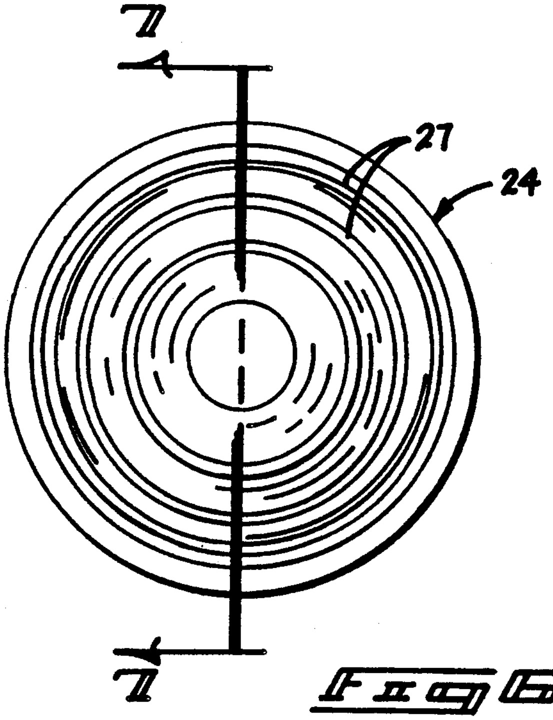
Fig 6

CONTAINER FLOW CONTROL APPARATUS

BACKGROUND OF THE INVENTION

1. Field of the Invention

The field of invention relates to valve apparatus, and more particularly pertains to a new and improved container flow control apparatus wherein the same meters and provides selective flow of fluid from an associated container mounted to the apparatus.

2. Description of the Prior Art

Various valving arrangements of various types have been provided in the prior art. Heretofore, however, the prior art has failed to provide a convenient and unitary organization arranged for mounting to a container for dispensing. Examples of prior art include U.S. Pat. No. 4,023,710 to Alexander, et al. wherein a valve is provided for the flow of particulate material.

U.S. Pat. No. 3,107,691 to Schwartz sets forth a valve coupling for a bleeding procedure in a hydraulic system.

U.S. Pat. No. 3,606,096 to Campbell sets forth a liquid dispensing arrangement mounted to a container utilizing a displaceable valve.

U.S. Pat. No. 4,013,197 to Ewald sets forth a valve stem arrangement mounted within a pressurized container, such as utilized in spray cans and the like.

As such, it may be appreciated that there continues to be a need for a new and improved container flow control apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of flow control devices now present in the prior art, the present invention provides a container flow control apparatus wherein the same permits selective displacement of a slider tube relative to a coupler mounted to a container to meter fluid flow from the container. As such, the general purpose of the present invention, which will be described subsequently in greater detail, is to provide a new and improved container flow control apparatus which has all the advantages of the prior art flow control devices and none of the disadvantages.

To attain this, the present invention provides a pouring control device mounted to a nozzle portion of a container, wherein the device includes a forwardly extending exit nozzle coaxially mounted to an upper housing that in turn is adapted to an associated container. The nozzle includes a coaxially arranged rod, with a conical truncated valve plug cooperative with a conical valve seat mounted within the upper housing, whereupon depressing the rod displaces the valve plug from the seat and directs fluid flow through the nozzle and a matrix of apertures provided within a floor of an associated slider tube mounted with the rod.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the Public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved container flow control apparatus which has all the advantages of the prior art flow control devices and none of the disadvantages.

It is another object of the present invention to provide a new and improved container flow control apparatus which may be easily and efficiently manufactured and marketed.

It is a further object of the present invention to provide a new and improved container flow control apparatus which is of a durable and reliable construction.

An even further object of the present invention is to provide a new and improved container flow control apparatus which is susceptible of a low cost of manufacture with regard to both materials and labor, and which accordingly is then susceptible of low prices of sale to the consuming public, thereby making such container flow control apparatus economically available to the buying public.

Still yet another object of the present invention is to provide a new and improved container flow control apparatus which provides in the apparatuses and methods of the prior art some of the advantages thereof, while simultaneously overcoming some of the disadvantages normally associated therewith.

Still another object of the present invention is to provide a new and improved container flow control apparatus wherein the same permits selective fluid flow through the organization upon displacement of a slider tube arranged for axial displacement relative to a container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings Wherein:

FIG. 4 is an orthographic side view, taken in elevation, of the invention secured to an associated container.

FIG. 5 is an orthographic side view, taken in elevation of the securement member utilized in adapting of various containers to the organization.

FIG. 6 is an orthographic top view, taken along the lines 6—6 of FIG. 5 in the direction indicated by the arrows.

DESCRIPTION OF THE PREFERRED EMBODIMENT

Figure 1:
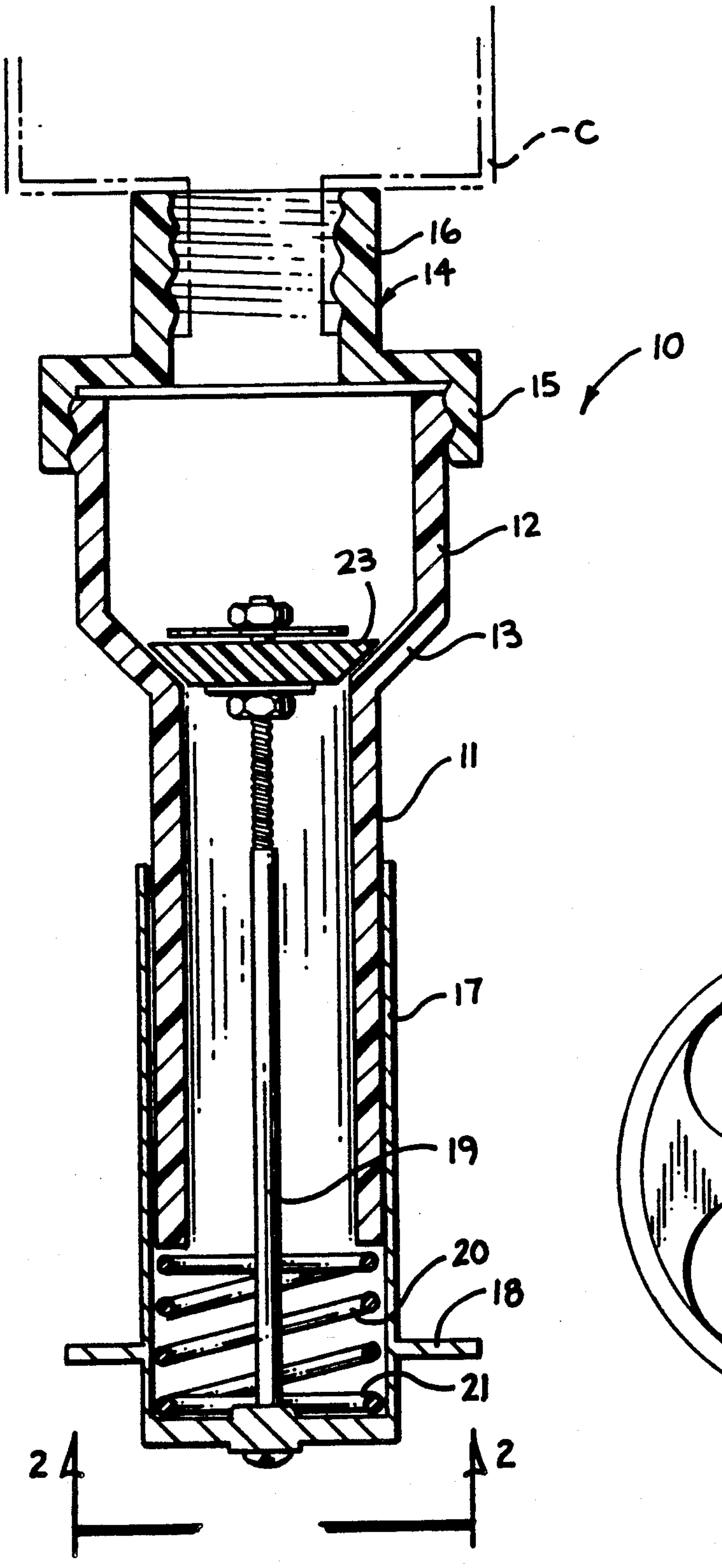
FIG. 1 is an orthographic cross-sectional illustration of the instant invention.
Figure 2:
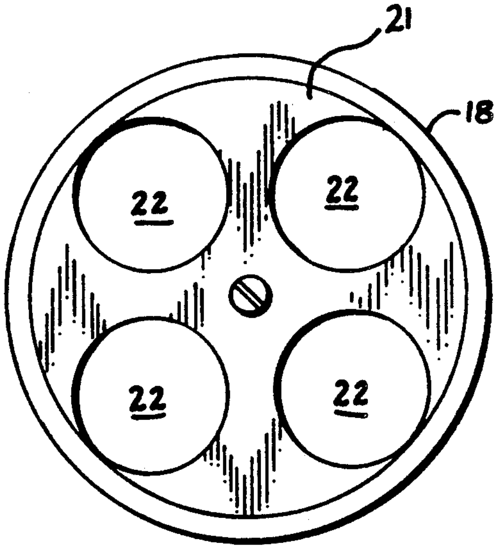
FIG. 2 is an orthographic view, taken along the lines 2—2 of FIG. 1 in the direction indicated by the arrows.

With reference now to the drawings, and in particular to FIGS. 1 to 8 thereof, a new and improved container flow control apparatus embodying the principles and concepts of the present invention and generally designated by the reference numeral 10 will be described.

More specifically, the container flow control apparatus 10 of the instant invention essentially comprises an elongate, tubular nozzle 11 defined by a predetermined first length and a predetermined external diameter. An upper housing 12 is coaxially and fixedly mounted to an upper terminal end of the nozzle 11 and includes an externally threaded upper terminal end to threadedly receive an internally threaded lower skirt 15 of an adapter housing 14 that further includes entrance conduit 16, with the adapter housing 14 and associated entrance conduit 16 and skirt 15 coaxially aligned with the adapter housing 14, the upper housing 12, and the tubular nozzle 11. The upper housing 12 includes a conical seat junction 13 coaxially aligned with the upper housing and nozzle 11 defining a junction between the housing 12 and the nozzle 11. It should be noted that the entrance conduit 16 includes an entrance conduit internal thread portion **16*a* to threadedly or slidably receive a container of the container "C" therewithin, or alternatively complementarily receive a securement member externally threaded nozzle 26 complementarily threaded to the internal thread 16*a*, with the externally threaded nozzle 26 formed fixedly to a lower terminal end of a container securement member 24, in a manner as illustrated in FIG. 5** for example, and to be discussed in more detail below.

A slider tube 17 defined by a predetermined second length less than or equal to the first length of the tubular nozzle 11 is defined by a predetermined internal diameter substantially equal to the predetermined external diameter of the nozzle 11. The slider tube 17 mounts coaxially thereabout an abutment flange 18 adjacent a lower terminal end of the slider tube 17. The slider tube 17 further includes a slider tube floor 21 fixedly, coaxially, and orthogonally mounted to the lower terminal end of the abutment flange 19 to coaxially and orthogonally mount a lower terminal end of a flow control rod 19. The flow control rod 19 extends upwardly through the slider tube 17 and the associated tubular nozzle 11 to fixedly secure a deformable and truncated conical valve plug 23 at its upper terminal end. The valve plug 23 is mounted to complementarily seat upon the conical seat junction 13. Further, the slider tube floor 21 is formed of a matrix of flow openings 22 therethrough. It should be noted that a captured coil spring is secured between the annular lower terminal end of the nozzle 11 and the floor 21, whereupon projection axially upwardly of the slider tube 17 it displaces the valve plug 23 from the internal surface of the conical seat junction 13 to permit fluid flow through the upper housing 12, the tubular nozzle 11, and subsequently through the flow openings 22.

To enhance securement of the organization to an associated container "C", the container securement member 24 is of a generally funnel shaped body construction, including an elastomeric strap 25 diametrically mounted to an upper terminal end of the securement member 24 that includes coaxially spaced annular steps defining abutment rings 27 of a decreasing diameter from the upper terminal end of the securement member 24 to a lower terminal end thereof to permit abutment of and reception of a container body "C" within one of the abutment rings 27.

Figure 3:
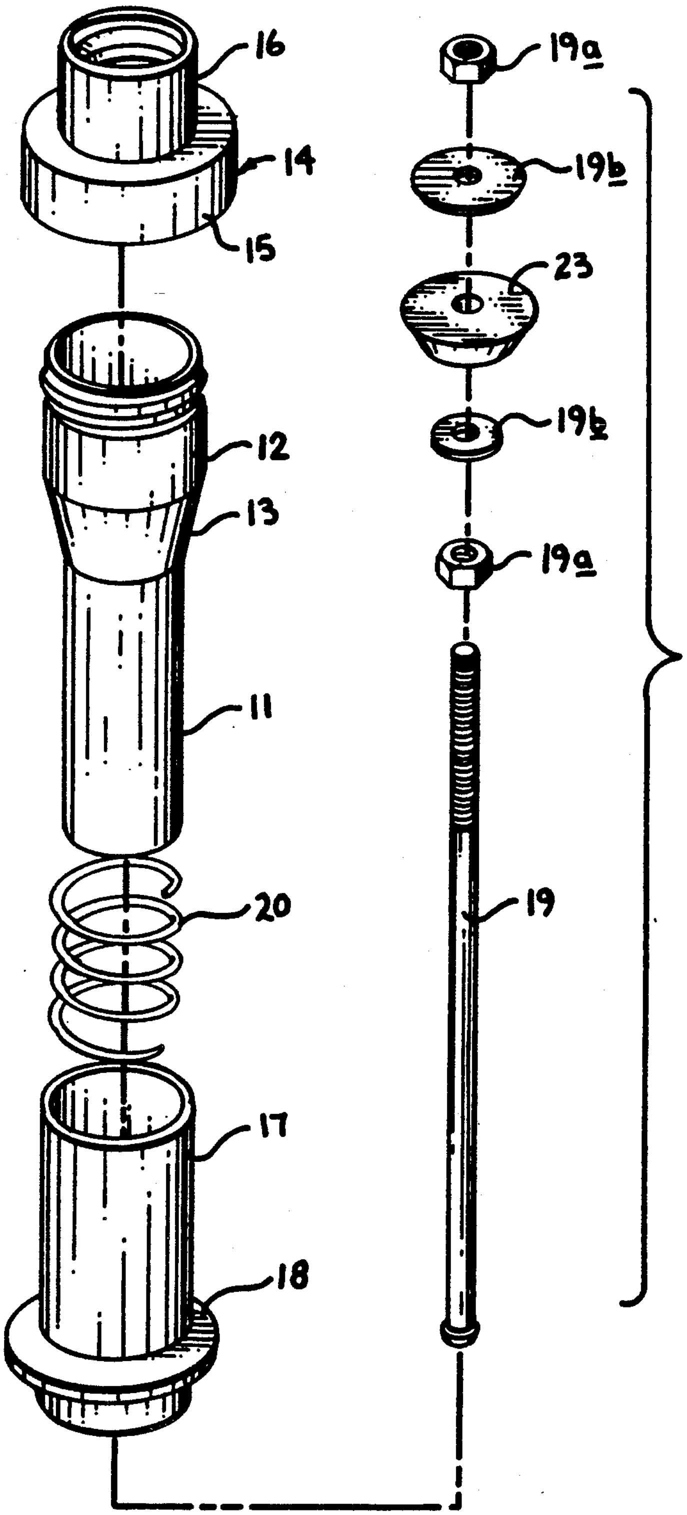
FIG. 3 is an isometric, exploded illustration of the instant invention.
Figure 7:
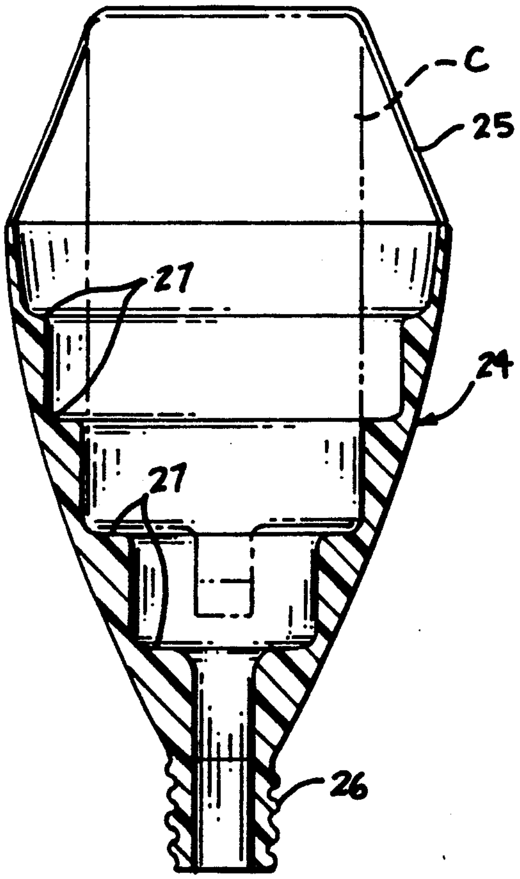
FIG. 7 is an orthographic view, taken along the lines 7—7 of FIG. 6 in the direction indicated by the arrows.
Figure 8:
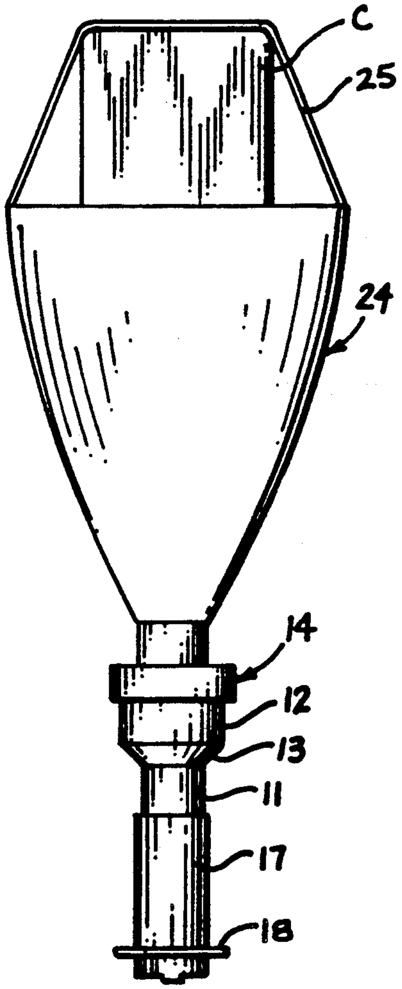
FIG. 8 is an orthographic side view, taken in elevation, of the invention and associated securement member mounted to an associated container.

With reference to FIG. 3, the use of conventional fastener nuts **19*a* and washer members 19*b* are mounted to each side of the valve plug 23 to permit its securement to the threaded upper terminal end of the flow control rod 19 in its mounting to the rod 19**.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A container flow control apparatus comprising, an elongate tubular nozzle, the tubular nozzle defined by a predetermined first length and a predetermined external diameter, the nozzle including an upper housing fixedly and coaxially mounted to an upper terminal end of the nozzle, with the upper housing defined by a housing diameter greater than the predetermined external diameter, and a conical seat junction coaxially aligned with the upper housing and nozzle and extending between a lower terminal end of the housing and an upper terminal end of the nozzle, and a slider tube defined by a predetermined second length greater than or equal to the predetermined first length and defined by the predetermined internal diameter substantially equal to the predetermined external diameter of the nozzle slidingly arranged coaxially about the nozzle, with the slider tube including a slider tube floor, the floor including a matrix of flow openings directed therethrough, and the floor including a flow control rod fixedly, coaxially, and orthogonally mounted to the slider tube floor extending upwardly thereof, and the rod including a deformable conically truncated valve plug mounted to an upper terminal end of the rod, the valve plug normally biased against an internal surface of the conical seat junction in a first position and displaced from the internal surface of the conical seat junction in a second position, and including a spring member contained within the slider tube and captured between a lower terminal end of the nozzle and the slider tube floor to normally bias the valve plug in the first position, and including an annular abutment flange orthogonally extending exteriorly of the nozzle adjacent the lower terminal end of the slider tube, and including an adapter housing removably mounted to an upper terminal end of the upper housing, the adapter housing including a lower skirt mounted securedly to the upper terminal end of the upper housing, and an entrance conduit coaxially aligned with the skirt and the upper housing, and the entrance conduit including entrance conduit internal threads, and including a container securement member, the container securement member defining a funnel shaped body, with a securement member externally threaded nozzle complementarily received within the entrance conduit internal threads, and wherein the container securement member includes an internal surface defined by coaxially spaced annular steps defining abutment rings of decreasing diameter from an upper terminal end of the container securement member to the securement member externally threaded nozzle, and wherein the container securement member includes an elastomeric strap diametrically mounted to the upper terminal end of the securement member to secure a container within the securement member and position the container upon one of the abutment rings.

* * * * *